Patented June 10, 1924.

1,496,973

UNITED STATES PATENT OFFICE.

DANA H. BENJAMIN, OF CLEVELAND HEIGHTS, OHIO, ASSIGNOR TO HENRIETTA C. BENJAMIN, OF CLEVELAND HEIGHTS, OHIO.

CENTRIFUGAL EXTRACTOR.

Application filed May 7, 1919. Serial No. 295,310.

*To all whom it may concern:*

Be it known that I, DANA H. BENJAMIN, a citizen of the United States, residing at Cleveland Heights, in the county of Cuyahoga and State of Ohio, have invented certain new and useful Improvements in Centrifugal Extractors, of which the following is a specification.

This invention relates to centrifugal extractors, such as are used for extracting liquid from solid material, and more particularly to extractors for laundry use.

The invention has particular reference to the driving means for rotating the extracting basket, its object being to provide an arrangement in which the elements of the driving gearing rotate about a fixed axis but the basket and the spindle supporting the same are permitted a certain amount of oscillating movement about a center, but wherein the basket is nevertheless positively driven, thereby increasing efficiency.

A further object of the invention is to provide extractor operating mechanism which provides for the downward thrust of the basket upon its bearing and which is readily lubricated without liability of the lubricant flowing to parts which might otherwise be injured thereby.

Further objects of the invention are in part obvious and in part will appear more in detail hereinafter.

Figure 1:
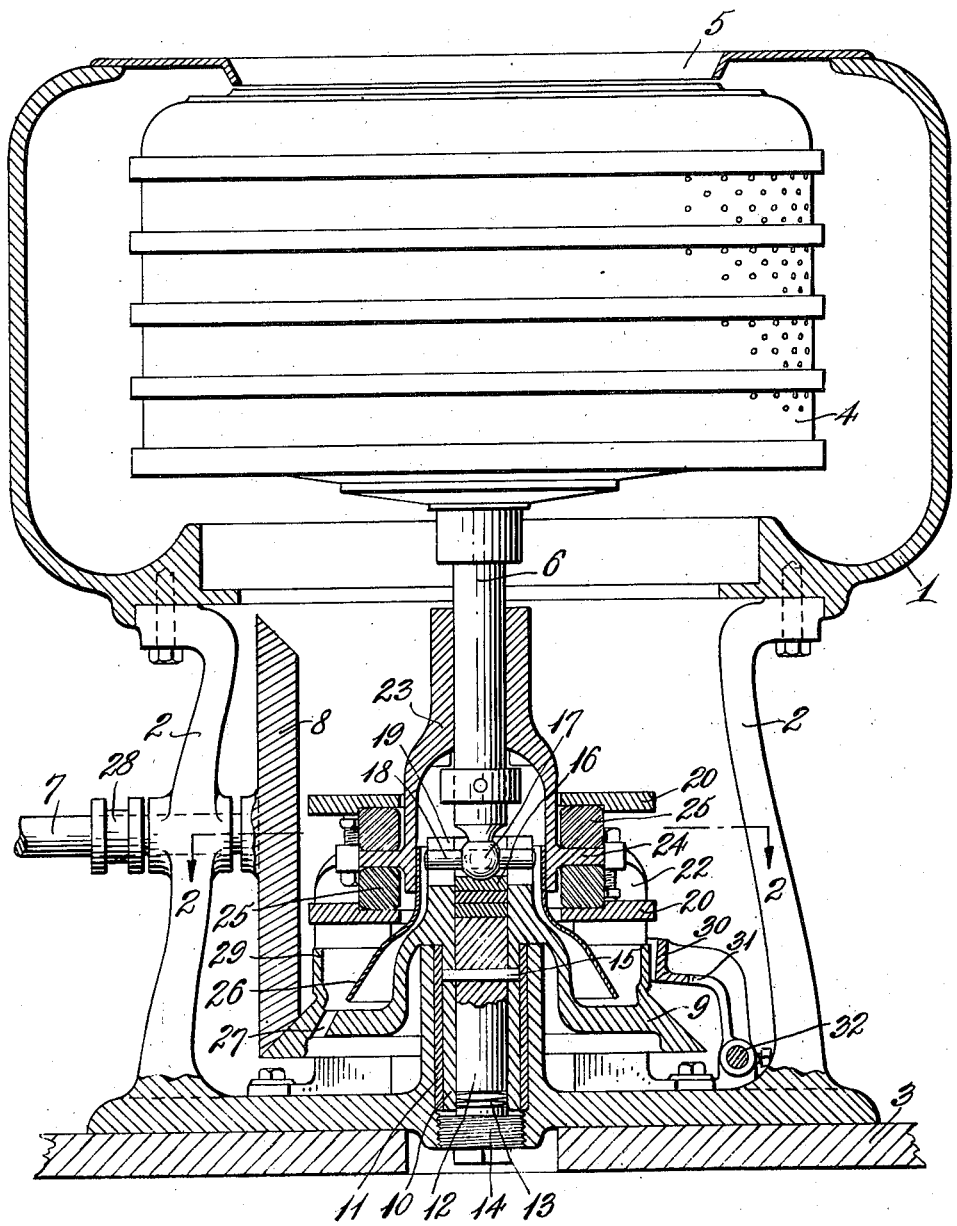
Figure 2:
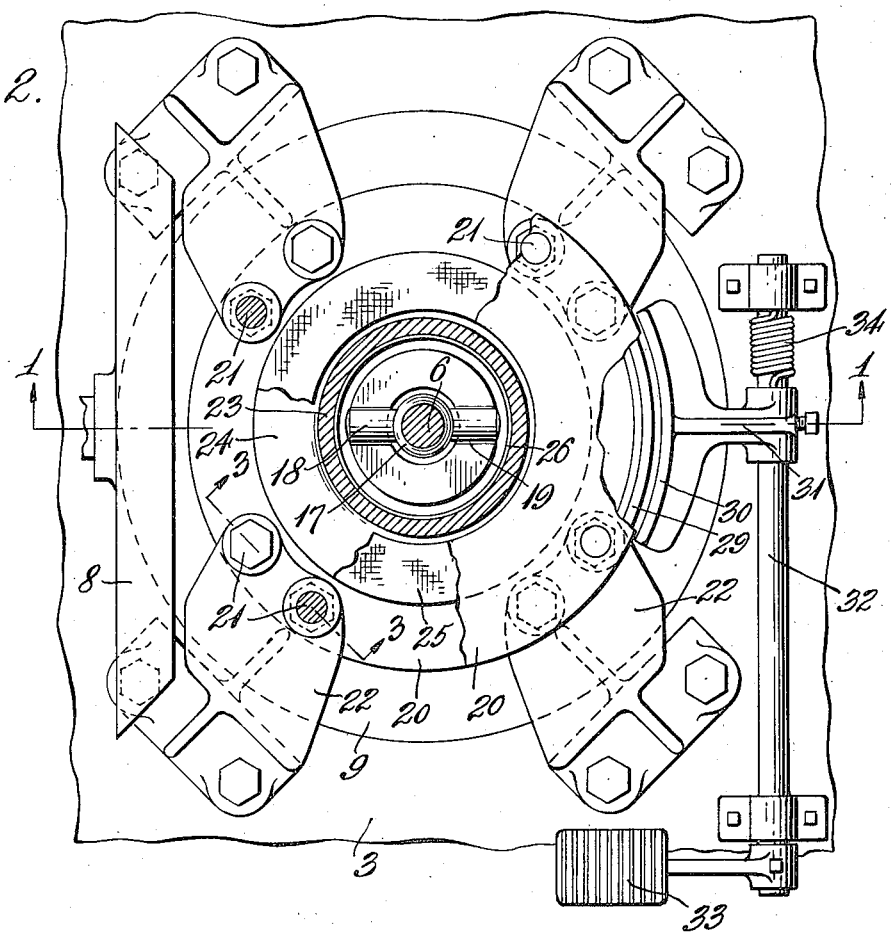
Figure 3:
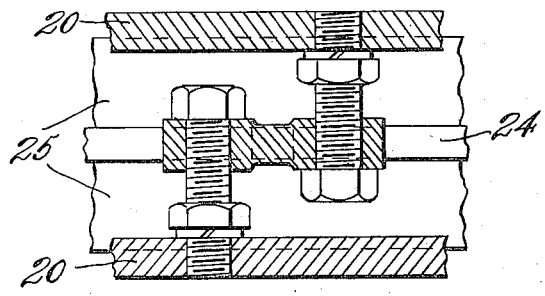

In the drawings, which represent one suitable embodiment of the invention Fig. 1 is a sectional elevation on the line 1—1, Fig. 2, looking in the direction of the arrows; Fig. 2 is a sectional plan view on the line 2—2, Fig. 1; and Fig. 3 is a detail sectional view on the line 3—3, Fig. 2.

The extractor shown in the drawings comprises the usual outer curb or casing 1 carried by supports 2 mounted upon a suitable base 3. 4 represents the extractor basket which has an open top, is mounted beneath the opening 5 in the curb and is carried by an extractor spindle 6. The basket has its peripheral portion made of perforated or foraminous material, such as heavy wire gauze, or sheet metal provided with a large number of small openings (only a few of which are shown), as is usual.

7 represents the main driving shaft connected to a suitable source of power either directly or through suitable clutch mechanism (not shown), as may be found desirable. Said shaft is provided on its inner end with a driving member 8 cooperatively related to a driven member 9 rotating on a central vertical axis and provided with a sleeve portion 10 turning in a bushing 11 of the solid frame. Member 9 therefore is held to rotate on a fixed axis in the solid frame. Within the sleeve 10 is a shaft member 12 mounted on the usual step bearing disks 13 held in place by a threaded plug 14. Shaft member 12 may be secured to rotate with the driven member 9 in any suitable manner, such as by a cross pin 15. Within said driven member said shaft supports one or several hardened bearing disks 16, the upper one of which is slightly concaved to form a seat for a spherical or ball head 17, formed on or attached to the lower end of the basket spindle 6. Said ball carries a through pin 18 whose outer ends lie in vertical slots or recesses 19 in the upper portion of the driven member 9.

The construction so far described forms essentially a universal joint connecting the driven member 9 to the basket spindle 6, because the basket spindle can oscillate a limited amount in any direction about the center of the ball head 17.

To resist the tendency of the basket to tilt to one side or the other suitable cushioning means is employed. The means shown in the drawings comprises upper and lower rings 20 attached by bolts 21 to a series of brackets or supports 22 carried by the stationary base. The drawings show four of such brackets, each bracket carrying two of the securing bolts 21, one of which is threaded downwardly through the bracket into the lower ring 20 and the other of which is threaded upwardly through the bracket into the upper ring 20. Surrounding the basket spindle 6 is a non-rotatable sleeve 23 having a depending portion provided with an angular flange 24 lying midway between the upper and lower rings, as shown in Fig. 1. Above and below said flange, and between the same and the upper and lower rings are yielding rubber springs 25. This arrangement enables the basket to tilt to one side or the other by compression of the bumpers, but the elasticity of said bumpers always tends to draw the spindle back to central position.

26 indicates an apron secured to the lower end of the member 23 and surrounding the upper portion of the driven member 9. Any oil supplied to the bearing between the non-rotatable member 23 and the shaft 6 therein, or which flows to the universal joint, travels down along the upper surface of the driven member 9 and is prevented from being thrown outwardly by said apron. The oil finally drains to the bottom of the stationary frame through a port or opening 27 in the driven member.

Members 8 and 9 may be beveled friction wheels, as shown, in which case cooperating driving relation may be established by shifting the shaft 7 longitudinally in its bearing, for which purpose it is provided with an angular grooved collar 28. Members 8 and 9 may however be provided with cooperating gear teeth, in which case rotation of the shaft 7 is started or stopped by manipulation of the clutch mechanism before referred to.

The extractor may also be provided with suitable brake mechanism preferably including a part which rotates on a fixed axis. For example, member 9 may be formed or provided with a brake drum 29 with which cooperates a pressure shoe 30 carried by an arm 31 on a shaft 32 mounted in bearings in the frame, and which shaft at its outer end is provided with a foot treadle 33. By depressing the treadle the shoe 30 is applied with pressure to the brake drum and retards the rotation of the basket. Spring 34 normally releases the brake.

In operation it is found that the construction described enables the basket even though unevenly loaded with a greater weight on one side than on the other to first turn at low speed in askew position and subsequently, as the speed of rotation is increased to approach more and more closely a neutral axis and finally spin on said axis.

What I claim is:

1. An extractor, comprising a frame, a basket, a depending spindle carrying said basket, a non-rotatable member sleeved on said shaft, yielding means between said member and the frame, driving means for said spindle rotatable about a fixed axis, and an apron connected to said non-rotatable member and lying over a portion of said driving means.

2. An extractor, comprising a frame, a basket, a depending spindle carrying said basket, a non-rotatable member sleeved on said shaft, yielding means between said member and the frame, a driving shaft supporting said spindle, a universal joint connecting said driving shaft and spindle, and an apron connected to said non-rotatable member and surrounding said shaft and joint.

3. An extractor, comprising a basket, a spindle carrying said basket, a shaft supporting said spindle and in driving relation therewith, an operating member on said shaft provided with an outer friction driving surface and a drain opening, a sleeve surrounding said spindle and having a depending apron extending downwardly to said operating member, and means for preventing outward travel of lubricant over said operating member to said driving surface.

4. An extractor, comprising a basket, a spindle carrying said basket, a shaft supporting said spindle and in driving relation therewith, an operating member on said shaft provided with a friction driving surface and a drain opening, and a sleeve surrounding said spindle and having a depending apron extending downwardly to said operating member, said operating member having an upwardly extending flange forming a brake drum and an oil receiving recess.

5. In an extractor, a drive shaft, a driven spindle, a universal driving connection between said shaft and spindle, and cushioning means for resisting oscillating movement of said spindle, said cushioning means occupying fixed position and being symmetrically arranged in a horizontal plane intersecting the center of oscillation.

6. In an extractor, a drive shaft, a driven spindle, a universal driving connection between said shaft and spindle, cushioning means for resisting oscillating movement of said spindle, said cushioning means occupying fixed position and being symmetrically arranged in all directions with reference to the center of oscillation of said spindle.

7. In an extractor, a drive shaft, a driven spindle, a universal joint connection between said shaft and spindle, cushioning means for resisting oscillating movement of said spindle, said means including annularly arranged cushioning means surrounding said universal joint and located one above and another below the center of oscillation, fixed bearing means for said cushioning means, and means having operative connection with said spindle extending between and co-operating with said annular cushioning means.

8. In an extractor, a drive shaft, a driven spindle, a universal driving connection between said shaft and spindle, annular cushioning members for resisting oscillating movement of said spindle, said cushioning members occupying fixed position and being symmetrically arranged in a horizontal plane through the center of oscillation of said spindle.

9. In an extractor, a drive shaft, a driven spindle, a universal driving connection between said shaft and spindle, cushioning means for resisting oscillating movement of said spindle, said means including annular cushioning members surrounding said universal driving connection and being located one above and another below the center of oscillation, fixed bearing means for said cushioning members, a sleeve loosely mounted upon said spindle, and an abutment on said sleeve located between said cushioning members to compress said cushioning members against said fixed bearing means.

10. In an extractor, a drive shaft, a driven spindle, a universal joint connection between said shaft and spindle, cushioning means for resisting oscillating movement of said spindle, said cushioning means including annular cushioning members arranged symmetrically about said universal joint, a collar loosely surrounding said spindle, fixed bearing members for said cushioning means lying above and below them, and an intermediate abutment carried by said collar and extending between said cushioning members for engagement therewith to compress said cushioning members against said fixed bearing members.

11. In an extractor, a drive shaft, a driven spindle, a universal joint connection between said shaft and spindle, cushioning means for resisting oscillating movement of said spindle, said cushioning means including annular cushioning members arranged symmetrically in all directions with reference to said universal joint, a collar loosely mounted about said spindle and provided with means for engagement with said cushioning members, and bearing members fixedly mounted above and below said cushioning members and having engagement therewith.

In testimony whereof I affix my signature.

DANA H. BENJAMIN.